United States Patent [19]
Linder et al.

[11] Patent Number: 5,582,463
[45] Date of Patent: Dec. 10, 1996

[54] SEAT ASSEMBLY WITH IMPROVED ATTACHMENT OF A SUSPENSION MAT TO A SEAT FRAME

[75] Inventors: Lucinda H. Linder, Brighton; Kannan Stanz, Livonia; James A. Johnson, Brighton; Duane E. Potes, Jr., Adrian; Philip E. Henderson, Whitmore Lake; Greg Haupt, New Hudson; Jeff Arnoldy, Allen Park, all of Mich.

[73] Assignee: Hoover Universal, Inc., Plymouth, Mich.

[21] Appl. No.: 500,174

[22] Filed: Jul. 10, 1995

[51] Int. Cl.$^6$ .................................................. A47C 7/14
[52] U.S. Cl. ........................ 297/452.2; 297/452.56; 297/452.63; 297/218.5
[58] Field of Search ................. 297/452.56, 452.63, 297/440.11, 218.5, 344.1, 341, 452.2

[56] References Cited

U.S. PATENT DOCUMENTS

| | | | |
|---|---|---|---|
| 2,865,436 | 12/1958 | Thorne | 297/440.11 |
| 3,175,269 | 3/1965 | Raduns et al. | 297/452.63 X |
| 3,179,469 | 4/1965 | Heuston | 297/452.56 |
| 3,423,775 | 1/1969 | Cockerill | 297/218.5 |
| 4,105,244 | 8/1978 | Colby | 297/440.11 X |
| 4,558,904 | 12/1985 | Schultz | 297/440.11 |
| 4,602,817 | 7/1986 | Raftery | 297/440.11 X |
| 4,666,208 | 5/1987 | Tatematsu et al. | 297/341 |
| 5,013,089 | 5/1991 | Abu-Isa et al. | 297/452.56 X |
| 5,439,271 | 8/1995 | Ryan | 297/344.1 |
| 5,468,050 | 11/1995 | Hall et al. | 297/344.1 |

*Primary Examiner*—Peter M. Cuomo
*Assistant Examiner*—Stephen Vu
*Attorney, Agent, or Firm*—Harness, Dickey & Pierce, P.L.C.

[57] ABSTRACT

Attachment of a suspension mat to a tubular seat frame is accomplished by partially or fully forming the tubular frame at the location of the attachment with a concave surface. The suspension mat has a J-clip fastener which conforms to the shape of the formed tube and is fitted around the tube and seated partially into the formed concave area. By forming the tube, and producing a concave surface portion on the tube, the J-clip fastener can be seated on the bent edge of the concave surface portion and prevented from rotating about the tube axis.

7 Claims, 3 Drawing Sheets

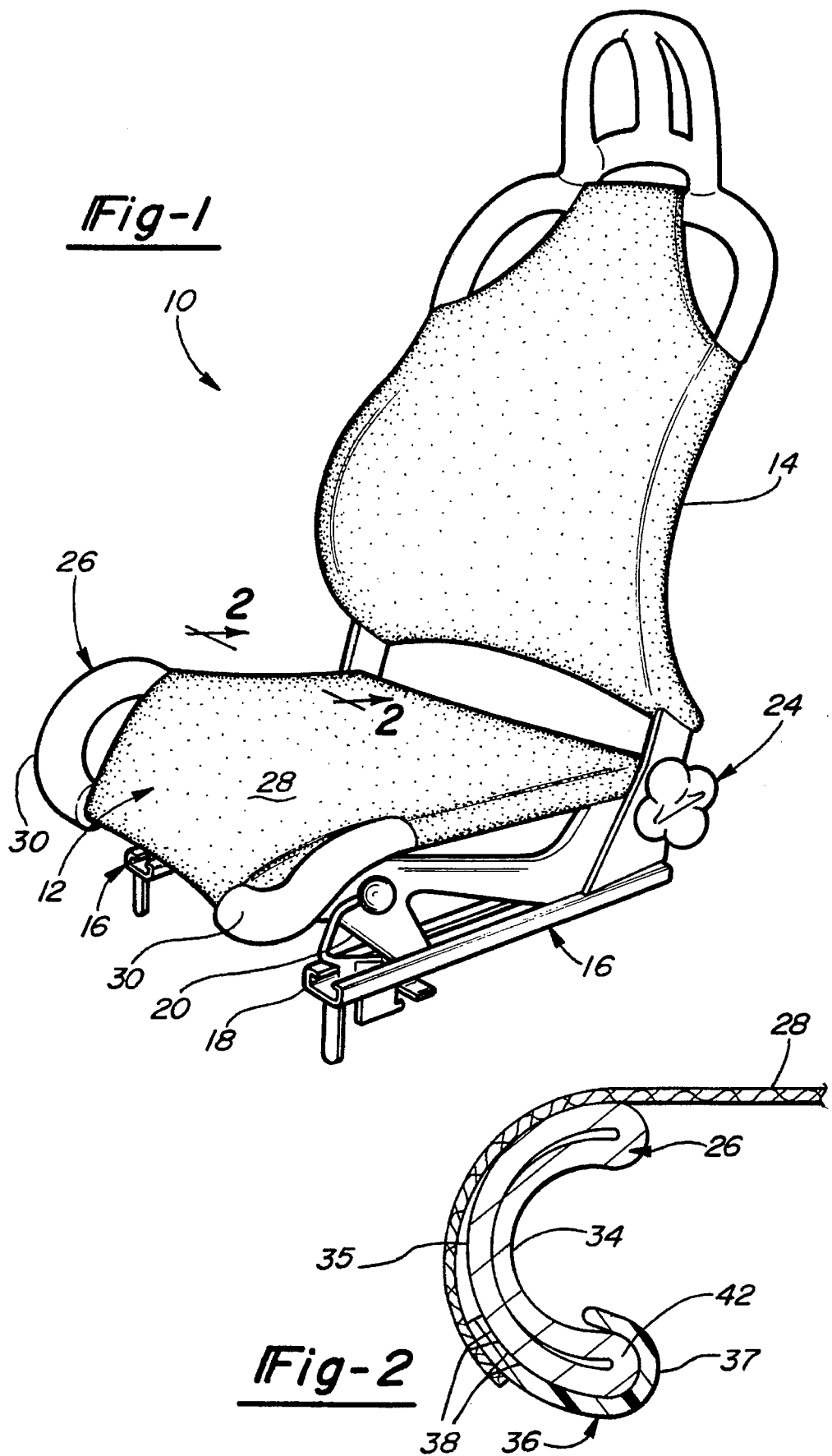

SEAT ASSEMBLY WITH IMPROVED ATTACHMENT OF A SUSPENSION MAT TO A SEAT FRAME

BACKGROUND AND SUMMARY OF THE INVENTION

The present invention relates generally to a seat construction and in particular to an attachment of a suspension mat to a tubular seat frame.

One way of constructing a seat, such as a vehicle seat, home furniture seat or lawn furniture seat, is to provide a structural frame upon which a seat suspension mat is supported. The suspension mat can then be used to support a resilient foam pad, or alternatively, the suspension mat can be used as the seating surface. This eliminates the need for a foam cushion and provides a lightweight and low cost seat. One example of a seat in which an occupant sits directly on a suspension mat is a director's chair. A director's chair includes a lightweight folding frame with a woven material spanning across the frame upon which a person sits. A variety of materials can be used for the frame including wood, metal, plastic composites, etc.

Metal tubing is a desirable frame material, especially when the frame will be bent in multiple directions. Metal tubing can easily be bent in multiple directions because its bending characteristics are similar regardless of which direction it is bent. Attachment of the suspension mat to a tubular frame is sometimes accomplished by a plurality of screws along the sides of the mat. Additional reinforcements for the mat may also be required at the point of attachment such as eyelets at the screw holes or a wire or rib sewn into a hem along the edge of the mat.

It is an object of the present invention to provide an improved and simplified attachment of a suspension mat to a tubular seat frame.

The suspension mat attachment of the present invention utilizes a J-clip fastener attached to the edge of the suspension mat. At the location where the J-clip fastener is attached to the tube, the tube is formed inward over a portion of the tube circumference. This produces a concave tube surface portion. The J-clip fastener is configured to match the shape of the tube and engages both the concave, formed tube portion, and the convex, non-formed tube portion. By forming the tube where the J-clip fastener is attached, the J-clip fastener can be attached in a manner that precludes rotation of the fastener about the tube axis. By preventing rotation of the fastener about the tube, the mat remains in a fixed position and with a known amount of tension. The amount of tube deformation or forming is dependent upon the material, diameter and wall thickness of the tube and the strength requirements for the seat frame. The suspension, once attached to the tube, can be used as the primary seating surface or it can be used to support an upholstered foam pad.

The invention is broadly defined as a seat assembly including a support frame having a tubular member with a cylindrical surface which has an attaching section in which the tubular member is formed about a portion of its cylindrical surface producing a concave surface portion and a convex surface portion with a bent edge therebetween. A suspension mat is attached to the tubular member at the attaching section. The suspension mat is attached by a fastener that is coupled to the suspension mat and has a generally hook shaped configuration to engage the attaching section of the tubular member and wrap around and cover the bent edge of the tubular member.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat having a tubular frame and a suspension mat attached to the frame according to the present invention;

FIG. 2 is a sectional view as seen from substantially the line 2—2 of FIG. 1 illustrating the attachment of the suspension mat to the tubular frame;

DETAILED DESCRIPTION OF THE PREFERRED EMBODIMENT

Figure 3:
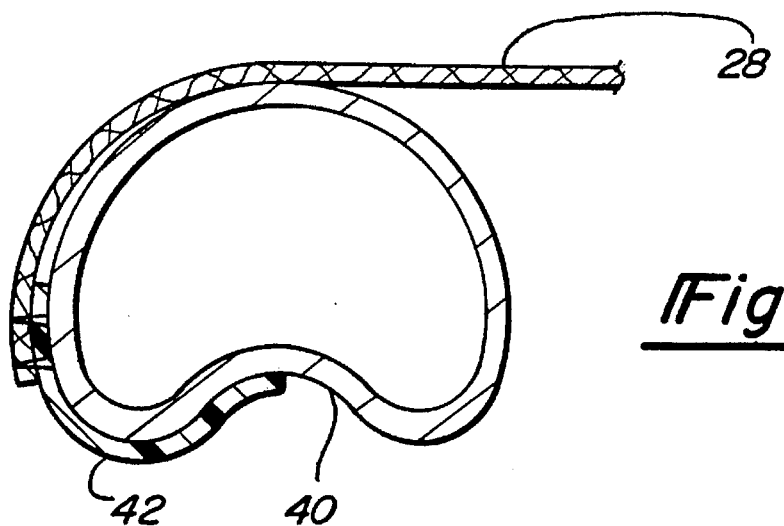
FIGS. 3 and 4 are sectional views similar to FIG. 2 showing the attachment of a suspension mat to the tubular frame with differing amounts of tube deformation.

A seat 10 shown in FIG. 1 includes a suspension mat attached to a tubular frame according to the present invention. The seat 10 has a lower seat cushion 12 and a seat back 14 which extends upwardly from the rear of the seat cushion. The seat 10 is equipped for use as a vehicle seat and includes, along each side of the seat, a fore and aft adjustable slide track 16. Each slide track has a stationary part 18 which is adapted to attach to a motor vehicle and a sliding part 20 which moves fore and aft relative to the stationary part 18. The sliding part 20 extends upwardly from the stationary part 18. The seat cushion 12 is rigidly attached to the sliding parts 20, while the seat back 14 is pivotally attached to the sliding pads 20. The angle of inclination of the seat back is variable by adjustment of a recliner 24 at the pivotal connection of the seat back to the sliding parts.

The seat cushion 12 has a tubular frame 26 about the periphery of the cushion and a suspension mat 28 spanning side-to-side and front-to-rear, over the frame 26. The mat 28 does not cover the two front corners 30 of the tubular frame 26. The mat 28 can cover the two front corners 30 of the tubular frame 26 if desired. The seat cushion frame 26 can be made of a variety of materials including, but not limited to, steel and aluminum. The tube is bent to form a three dimensional body. The three dimensional shape of the frame is particularly evident from the two front corners 30 of the frame, where the tube is bent inwardly and downwardly. A tubular frame member is desirable for bending in multiple directions because it has uniform bending properties in all directions.

The suspension mat 28 is tightly drawn over the frame 26 and attached to the frame along the mat edges. A variety of materials can be used for the mat, including woven natural and synthetic fibers and fiber reinforced plastic sheeting. It is important that the mat maintains its size and shape when under tension, as installed on the frame when the seat is not occupied. In other words, the mat should not permanently stretch over time due to the mat tension created by assembly of the seat. The mat will resiliently stretch when it is loaded and is acting as a suspension to dampen shock loads.

The attachment of the suspension mat to the frame is shown in greater detail in FIG. 2. The tubular frame 26 is formed at the locations of the frame 26 where the mat is attached, forming a concave surface portion 34. The concave surface portion, where the tube is formed, is the opposite of the nonformed, convex surface portion 35.

A J-clip fastener 36 is attached to the edge of the suspension mat 28 by a sewn seam 38 or other coupling. The J-clip fastener 36 has a return bend hook portion 37 which is shaped to fit over the bent edge portion along the edge of the tube. The advantage of forming the tube is that the J-clip fastener is not able to rotate about the tube axis. If the tube was not flattened but remained cylindrical and the J-clip fastener was also cylindrical to snap onto the tube, the J-clip fastener would be able to rotate around the tube axis. Rotation of the J-clip fastener may result in reduced tension in the mat. The J-clip fastener can be made of molded or extruded plastic, or stamped or formed metal. If molded plastic is used, it may be molded directly onto the edge of the suspension mat.

In FIG. 2, the tube is fully deformed, resulting in little or no hollow space within the tube. However, depending upon the desired diameter of the tube and the strength requirement for the seat frame, differing degrees of tube deformation can be utilized. For example, in FIG. 3 only a small portion 40 of the tube has been deformed, producing a kidney shaped tube cross section. The cross sectional shape of the J-clip fastener 42 will depend upon the particular configuration of the tube. FIG. 4 shows another variation in the tube deformation, wherein the concave surface portion 44 is larger than the concave surface portion 40 in FIG. 3. Again, the J-clip fastener 46 is shaped to fit the tube.

Figure 4:
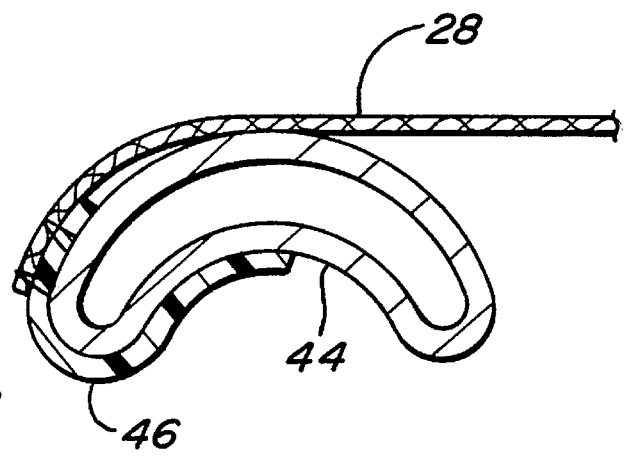

In FIGS. 3 and 4, the tube is formed upwardly on the bottom surface. In FIG. 2, the tube is formed laterally from the inner side so that the deformed portion is concealed by the mat. The lateral forming method enables the suspension mat to curve downwardly further around the outer side of the tube before connecting to the J-clip fastener 36. This impacts the appearance of the seat by covering more of the tube.

In FIG. 1, the suspension mat forms the seating surface. The J-clip to formed tube attachment can be used for a suspension mat that, in turn, supports an upholstered foam cushion. In such a case, both the suspension mat and the tubular frame would likely be covered by the foam and upholstery cover.

The attachment of the suspension mat to a tubular frame according to the present invention can be used in any type of seat. It is not limited to a vehicle seat such as that shown in FIG. 1. Home furniture, lawn furniture and office furniture may employ this attachment as well. The attachment of the present invention avoids the need of using screws or other attaching hardware that must be inserted into or welded onto the tubular frame. The resulting structure is easy to assemble and produces a lightweight, low cost seat.

Figure 5:
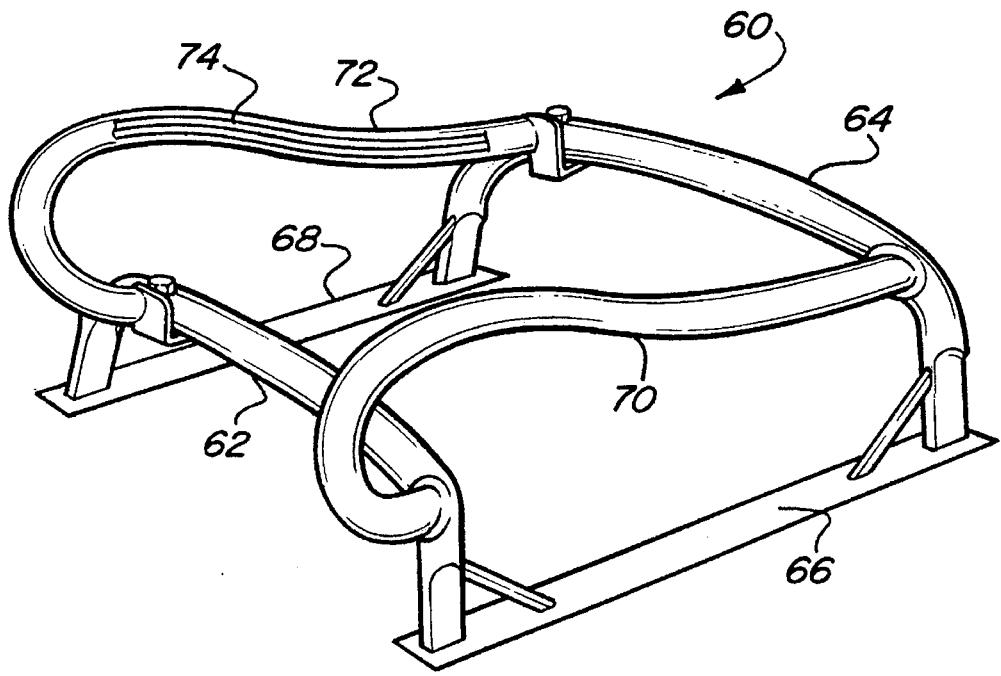
FIGS. 5, 6 and 7 are perspective views of an alternative embodiment of the tubular frame in which one support member of the frame is movably attached to enable the frame to be moved after attachment of the suspension mat for the purpose of tensioning the mat.
Figure 6:
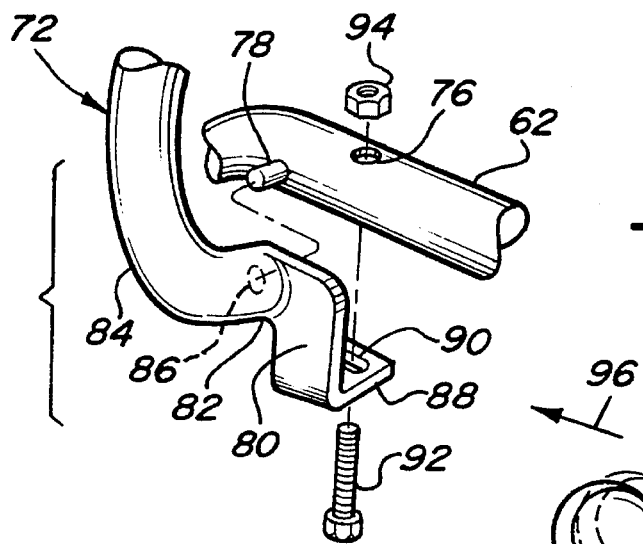
Figure 7:
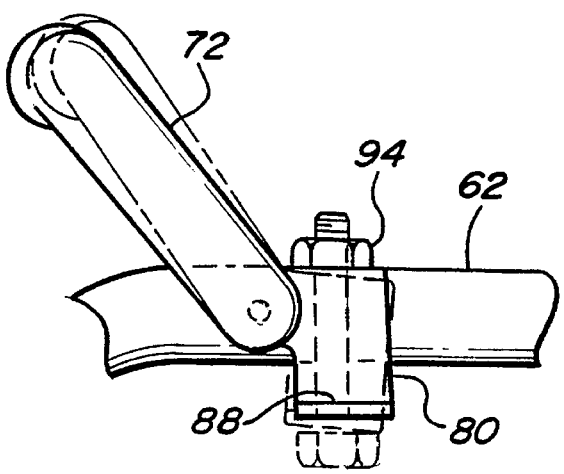

With reference to FIGS. 5, 6 and 7, an alternative embodiment of the seat cushion frame is shown and is designated generally at 60. The seat cushion frame 60 has a tubular front cross member 62 and a tubular rear cross member 64. The front and rear cross members are attached to mounting plates 66, 68. When used as an automotive seat, the mounting plates 66, 68 could be a part of the seat riser or a portion of the sliding part of the adjusting slide track.

The front and rear cross members together with the mounting plates form a subframe of the seat cushion frame 60. The front and rear cross members are spaced from one another and are fixed in place relative to one another.

The seat cushion frame 60 further includes a pair of lateral support members, the left support member 70 and the right support member 72. The left support member 70 is rigidly attached to the front and rear cross member 62, 64. As shown, the left support member is attached by welding. Other attachment means can be used as well. The right support member 72, however, is movably mounted to the cross members, as will be described below. The left and right support members are formed with a concave attaching section 74 for attachment of a suspension mat as described above. Only the concave attaching portion 74 on support member 72 is shown in FIG. 5.

The suspension mat typically needs to be stretched five to ten percent in the lateral direction to provide sufficient support and comfort, particularly when used as the seating surface without foam. The right support member 72 is movably mounted to the cross member to aid in assembly of the seat and stretching of the suspension mat. The attachment of the front end of the right support member 72 to the front cross member 62 is shown in FIGS. 6 and 7. A similar attachment is provided at the rear end of the support member 72 to the rear cross member 64. The front cross member 62 is formed with a vertically oriented through hole 76. A pivot pin 78 extends forward from the cross member 62 and is spaced slightly outboard from the through hole 76.

A plate 80 is welded to the front end 82 of the tube 84 that forms the right support member 72. An aperture 86 is formed in the plate 80 into the tube 84. The support member 72 is attached to the cross member by inserting the pin 78 into the aperture 86 in the support member.

The plate 80 extends inwardly and downwardly from the tube 84 and is then bent rearwardly, forming a lower flange 88 disposed beneath the through hole 76 in the cross member 72. A laterally extending slot 90 in the flange 88 is aligned with the through hole 76. A bolt 92 is inserted through the slot 90 and the hole 76. A nut 94 is threaded onto the end of the bolt 92. As the nut is drawn onto the bolt, the flange 88 will move upward toward the front cross member 62. This causes rotation of the support member 72 about the axis of the pivot pin 78 and rotates the support member 72 outward, away from the support member 70 as shown by the arrow 96 of FIGS. 7. The plate 80 is thus a pivot arm, causing rotation of the support member as the nut is tightened onto the bolt 92. The slot 90 allows for lateral motion of the pivot arm relative to the bolt 92 as the support member 72 rotates. The relative positions of the pin 78 and the through hole 76, together with the geometry of the plate 80 determines the amount of rotation of the support member.

The seat cushion is assembled by attaching the support member 72 to the cross members, but leaving the nuts and bolts in a loosened state so that the support member 72 can be moved to a near position, closest to the support member 70. With the support member in this position, a suspension is mat such as mat 28 shown in FIG. 1, is attached to the two support members. Afterwards, the nuts and bolts are tightened, causing the support member 72 to rotate outwardly thus stretching the suspension mat. The seat cushion frame 60 allows for easier assembly of the seat cushion since the mat can be attached to the frame without stretching. Only after attaching the mat is it stretched by moving the support member outward.

It is to be understood that the invention is not limited to the exact construction illustrated and described above, but that various changes and modifications may be made without departing from the spirit and scope of the invention as defined in the following claims.

We claim:

1. A seat assembly comprising:

a support frame having an elongated hollow tubular member with a generally circular cross section having a convex surface, said tubular member having an attaching section along a portion of the length of said elongated tubular member, said attaching section comprising a recess in said tubular member such that in cross section said tubular member has both convex and concave surface portions;

a suspension mat attached to said attaching section of said tubular member; and a fastener coupled to said suspension mat having a hook configured to engage said attaching section of said tubular member and to engage both said concave surface portion and said convex surface portions of said attaching section of said tubular member.

2. The seat assembly of claim 1 wherein said tubular member has a plurality of said attaching sections and said suspension mat has a plurality of said fasteners.

3. The seat assembly of claim 1 wherein said frame is bent in multiple directions to form a three dimensional body having spaced opposite sides each having one of said attaching sections, said suspension mat being drawn tight between said opposite sides and said suspension mat having one of said fasteners along opposite edges for attaching said suspension mat to said opposite sides of said frame.

4. The seat assembly of claim 1 wherein said fastener is an elongated strip fastener.

5. The seat assembly of claim 1 further comprising a pair of fore and aft slide tracks carrying said frame for fore and aft movement, said slide tracks each having a fixed part for mounting to a support structure and a sliding part which moves fore and aft on said fixed part, said support frame being mounted to said sliding parts for movement therewith.

6. The seat assembly of claim 1 wherein said fastener is sewn to said suspension mat along an edge thereof.

7. The seat assembly of claim 1 wherein said fastener is a plastic molding molded onto an edge of said suspension mat.

* * * * *